United States Patent

Carbrey

[15] 3,651,518

[45] Mar. 21, 1972

[54] REDISTRIBUTION CIRCUIT FOR ANALOG TO DIGITAL AND DIGITAL TO ANALOG CONVERSION AND MULTILEVEL PRE-EQUALIZERS

[72] Inventor: Robert Lawrence Carbrey, Boulder, Colo.

[73] Assignee: Bell Telephone Laboratories, Incorporated, Murray Hill, N.J.

[22] Filed: Mar. 11, 1970

[21] Appl. No.: 18,447

[52] U.S. Cl. ..............................340/347 AD, 340/347 DA

[51] Int. Cl. ..............................H03k 13/12

[58] Field of Search..............340/347; 325/38; 179/15 AP, 179/15 AC

[56] References Cited

UNITED STATES PATENTS

| | | | |
|---|---|---|---|
| 3,449,741 | 6/1969 | Egerton | 340/347 |
| 3,309,693 | 3/1967 | Davis | 340/347 |
| 3,438,024 | 4/1969 | Smith | 340/347 |
| 2,932,017 | 4/1960 | Prince | 340/347 |
| 3,140,481 | 7/1964 | Hoffman | 340/347 |
| 3,180,939 | 4/1965 | Hall | 179/15 AC |

*Primary Examiner*—Maynard R. Wilbur
*Assistant Examiner*—Jeremiah Glassman
*Attorney*—R. J. Guenther and E. W. Adams, Jr.

[57] ABSTRACT

Each of a plurality of capacitors is charged to a weighted reference charge or discharged in response to digital information. At a subsequent time, all capacitors are connected in parallel and charge redistributes among them. The redistribution voltage which thereby settles across the parallel combination corresponds to an analog sample voltage.

7 Claims, 7 Drawing Figures

INVENTOR
R. L. CARBREY
BY David P. Kelley
ATTORNEY

REDISTRIBUTION CIRCUIT FOR ANALOG TO DIGITAL AND DIGITAL TO ANALOG CONVERSION AND MULTILEVEL PRE-EQUALIZERS

BACKGROUND OF THE INVENTION

This invention relates to digital transmission systems. In particular, it relates to the conversion of analog signals and pulse code modulated signals, one to the other, and to the automatic equalization of digital signals.

In pulse code modulation (PCM), samples of analog signals are encoded as combinations of discrete levels, known as quantum levels. The samples are encoded as PCM words, each word comprising a series of digital ones and zeroes. Each digit of the PCM word thus corresponds to a different sized block of quantum units; typically, a "1" represents the presence of that particular block of levels in the encoded sample and a "0" represents its absence. Generally, then, the sample is encoded by choosing the particular sets of quantum levels which best represent the particular analog sample. The decoding process usually involves the addition of the blocks of quantum units which are designated in the PCM word as elements of the encoded sample. Thus, the decoded sample is an approximation of the original analog sample, and the accuracy of the process is controlled by the ability of the encoder to assign the quantum levels accurately.

Accuracy is also affected by distortion caused by irregularities in the transmission media. A chief effect of distortion is intersymbol interference. Generally, pulses are transmitted in the form of the familiar sin $x/x$ waveform. Thus, without distortion, a given pulse has a finite value at the sampling time of interest and is zero at other sampling points. However, distortion causes the pulses to assume some finite value at the other sampling times and thereby interfere with correct determination of other pulses. To correct for this distortion, equalization is employed; i.e., small signals displaced in time from the main signal are added to or subtracted from the transmitted signal to negate the effect of distortion and thereby reduce interpulse distortion to zero at all sampling times of interest. In this manner, intersymbol interference is minimized.

One class of PCM converters, of which the PCM encoders embodying the principles of the present invention are members, is the successive approximation, or digit-at-a-time encoders. Typically, these encoders operate by making a series of decisions, one for each block of quantizing units in the coded sample. For example, the conversion procedure might require a series of comparisons of the sample to be converted with different sized blocks of quantum units. In response to the comparisons, the conversion unit would have to decide whether the sample is in the amplitude range immediately above or below the block size under consideration.

The PCM decoders which embody the principles of the present invention, although similar in structure to the coders, are really parallel decoders. That is, a series of switch settings in the decoders network correspond to the digital code word. All of the digits of the code word may therefore be considered simultaneously in obtaining the proper switch settings, thereby attaining parallel operation.

Successive approximation coders are reasonably fast, but are limited by the fact that a single decision circuit has to operate $n$ times for an $n$ digit code word. Offsetting any penalties in speed, however, is the relative simplicity of apparatus and the attainable encoding accuracies. The chief advantage of the parallel decoders, of course, is the substantial speed of operation.

A class of equalizers of which the equalizers which embody the principles of the present invention are members is described in a *Bell System Technical Journal* article entitled, "Automatic Equalization for Digital Communication," by R. W. Lucky, VOl. XLIV, page 547. Members of this class are known as transversal filters, and may be utilized at either the transmission end (pre-equalizers) or at the receiving end of the transmission system. Transversal filters typically feature multitapped delay lines. At each tap are adjustable attenuators which are adjusted in response to information regarding the distortion introduced by the transmission medium, all of which connect to a common summing bus. Thus, if each tap corresponds to a different sampling time and individual samples pass from tap to tap at each summing period, scaled versions of each sample being considered are added together, the net effect of which is to eliminate the effect of all samples but the principal sample for that sampling time. A subclass of this class digitally encodes the analog samples before equalization, and utilizes shift registers as delay lines.

The principles of the present invention are especially attractive in that they are applicable to PCM encoders and decoders. In addition, they may be used advantageously in digital equalizers. PCM converters embodying the principles of the present invention derive benefits from both the digit-at-a-time and the parallel converters. These include adaptability, accuracy of performance, and substantial simplicity of apparatus. Equalizers which utilize the principles of the invention show substantial improvement over much of the prior art in simplicity and accuracy.

The present invention is in a circuit arrangement which is applicable to analog to digital and digital to analog PCM converters and to the transversal pre-equalizers. It employs a plurality of capacitors operating in a charge redistribution mode. Since the charge placed on the capacitors is weighted according to the binary code, each of the capacitors corresponds to a binary digit. The weighting may be accomplished by properly choosing the size of each capacitor or of the reference voltage to which each capacitor may be charged.

In an illustrative embodiment of the invention, a plurality of capacitors, each associated with a binary digit, is switched either to ground or to a reference voltage source. This switch operation is controlled by half period pulse timing. In the first half period, in response to digital information, each capacitor is either discharged or charged to a weighted reference voltage. In the second half period, all capacitors are switched in parallel and the charge redistributes among them. The voltage across this parallel combination corresponds to an analog sample voltage.

It is a feature of the present invention that capacitive stored voltages are manipulated in accordance with the binary code to obtain linear PCM encoding and decoding characteristics in serial or parallel converters. In addition, automatic scaling provides an optimum match to the signal level. It is another feature of the present invention that it may be applied to multilevel pre-equalizers to obtain equalization of digital signals over a variable characteristic transmission medium.

DETAILED DESCRIPTION

Figure 1:
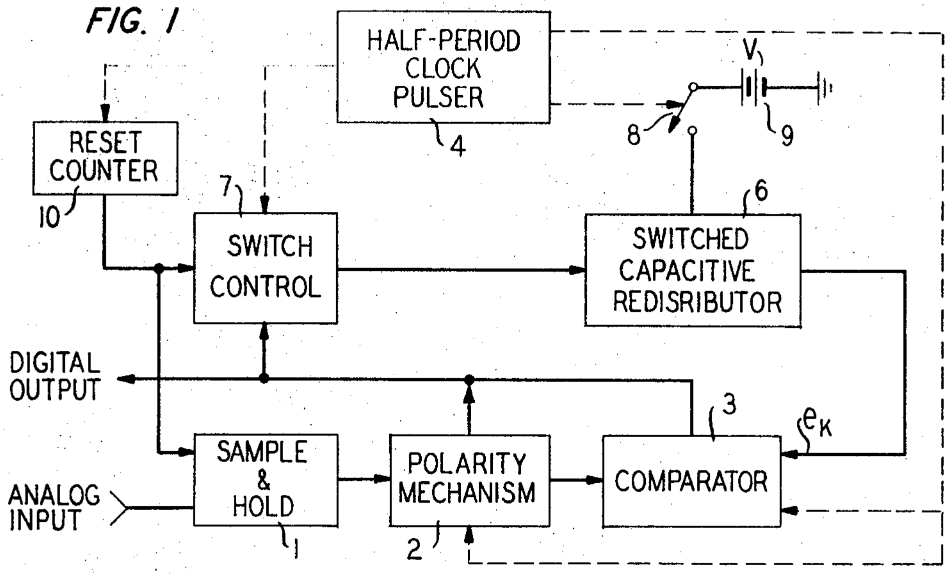
FIG. 1 shows a block diagram of an analog to digital converter which employs the principles of the present invention.

We shall first consider the principles of the invention insofar as they apply to PCM converters. Turning first to FIG. 1, we see a block diagram of an analog to digital converter which embodies the principles of the invention. The encoder of FIG. 1 is a serial, or sequential, encoder. Analog samples are received by the sample and hold circuit 1 and are transmitted to a polarity mechanism 2. The polarity mechanism 2 may be embodied as any one of the schemes in common use for adapting unipolar converters to bipolar operation. Two examples are polarity switching and full wave rectification. It is to be understood that the polarity mechanism 2 shown in FIG. 1 might also include a variety of additional apparatus such as offsetting biasing voltages or additional switch control mechanisms. It is the function of the polarity mechanism 2 to transmit to the comparator 3 a version of the analog signal which may be accommodated by the encoder and to produce a digital signal which is indicative of the polarity of the analog input. The comparator 3, operating under the control of timing pulses from the half-period clock pulser 4, compares the analog sample from the polarity mechanism 2 with an analog approximation voltage, $e_K$, from the switched capacitive redistributor 6. On the basis of these comparisons the comparator emits digital signals which are transmitted to the switch control mechanism 7 as well as to the digital output bus. The switch control 7, under the control of clock pulses and in response to the digital signals from the comparator, operates the switching means within the switched capacitive redistributor 6. More details on this procedure will be discussed below. The half-period clock pulser 4 operates a single pole single throw switch 8 which connects the switched capacitive redistributor 6 with a reference voltage source 9. Finally, a reset counter 10 keeps a count of the digit encoding process, and initiates and terminates the encoding of each PCM word. The operation of this encoder will be discussed in considerable detail later.

Figure 2:
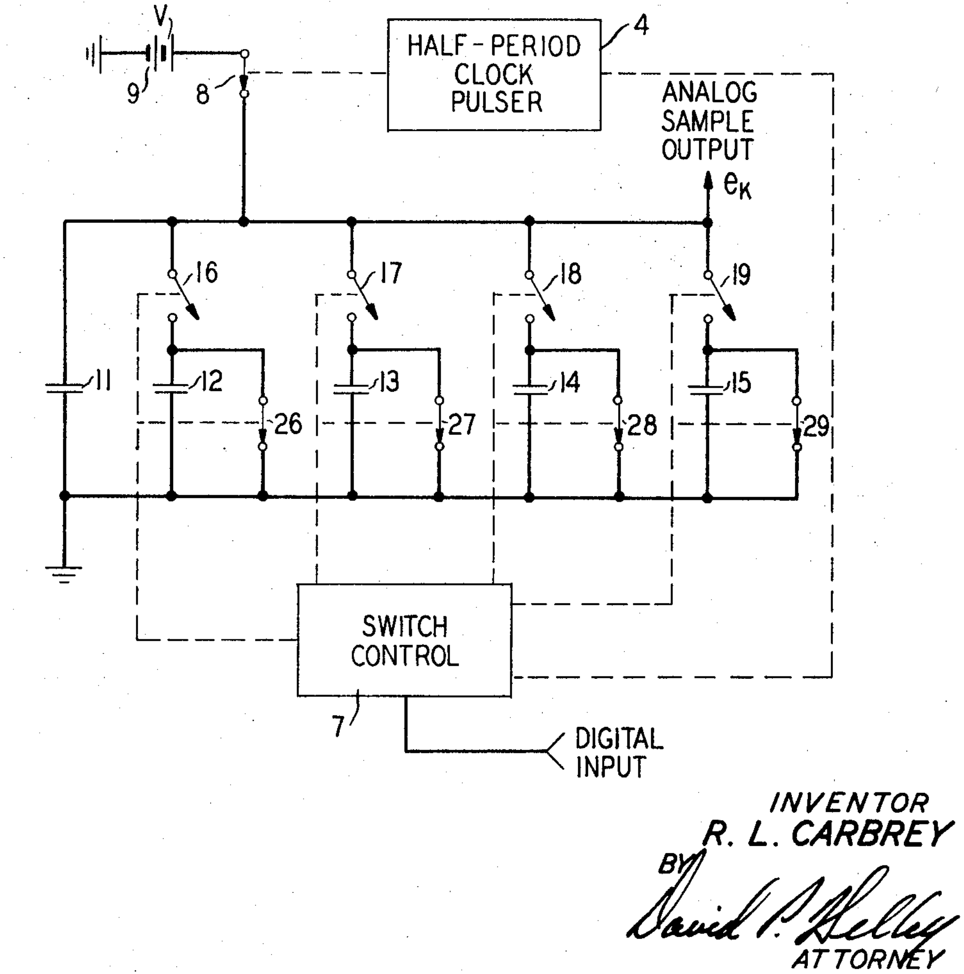
FIG. 2 is a first illustrative embodiment of a portion of the encoder of FIG. 1.

To fully appreciate the encoding operation, however, it is necessary to consider a circuit diagram of a portion of the encoder of FIG. 1. FIG. 2 shows a more detailed view of the portion of the encoder of FIG. 1 which includes the switch control 7, the clock pulser 4, the switched capacitive redistributor 6, switch 8, and the reference voltage source 9. Wherever possible, the same components are designated by the same number as they were in FIG. 1.

In the circuit of FIG. 2, the designated digital input to the switch control 7 is the digital output from the comparator 3 of FIG. 1. Likewise, the analog sample output of FIG. 2 is the analog sample approximation voltage, $e_K$. The functional core of the apparatus of FIG. 2 is the plurality of capacitors 11 through 15. These capacitors are weighted according to the binary code; that is, capacitors 11 through 15 are valued at C, 8C, 4C, 2C, and C, respectively. Capacitor 11 is fixed between ground and the output bus while capacitors 12 through 15 are connected by switches 16 through 19 to the analog output bus and by switches 26 through 29 to ground. The two switches with which each capacitor is associated operate in a complementary mode; that is, when one is closed, the other is open. These switches are operated by the switch control network 7. It is convenient to define a reset position as the configuration of the switches as follows: switches 8, 16, 27, 28, and 29 closed, and switches 26, 17, 18, and 19 open. At the beginning of the synthesis of each PCM word, all switches are returned to the reset position.

The timing arrangements for these switches are quite important. The synthesis of each PCM word is of course controlled by the reset counter 10. Thus, if the PCM word is to comprise $n$+1 digits (one polarity digit and $n$ quantum level digits), the reset counter 10 causes the switch control 7 to reset all switches in the switched capacitive redistributor 6 to the reset position after every $n$+1 clock periods. Each clock period is further divided into two equal parts: a charging period and a redistribution period.

More detail about the switch control network 7 is also appropriate. It is the adjustability of this network which makes the invention amenable to both the sequential and flash modes of operation. If, for example, the switch control consists of a selective type of network which is capable of operating the switch pairs independently, sequential operation can be obtained. On the other hand, if the switch control comprises a plurality of individual controlling mechanisms such as flip flops, each flip flop operating a complementary pair of switches, parallel operation may be obtained.

The operation of the encoder of FIG. 1, with the embodiment of FIG. 2 inserted and adjusted for serial operation, proceeds as follows. Initially, all switches are placed in the reset position. Thus, during the first charging period, capacitors 11 and 12 are charged to the reference voltage v. During the first redistribution period, then, all capacitors are switched in parallel, and charge redistributes among them. Since the total capacitance of the parallel combination is 16C, the voltage which settles across the combination is 9v./16 (the charge Q on a capacitor is governed by the relationship $Q=C\times V$, where $C$ is the capacitance and $V$ is the voltage across the capacitor). This charging and redistribution takes place while the polarity mechanism is synthesizing the first, or polarity, digit. Thus, when the comparator makes its first comparison of the analog signal with $e_K$, eK is the redistribution voltage of 9v./16. If the sample voltage is greater than $e_K$, a pulse, or a digital " 1," is transmitted to the digital output and the switch control; otherwise, no pulse, or a digital "0," is emitted. If the digit is a "1," switch 16 will be closed during each of the succeeding charging steps of the encoding of the instant analog sample. If it is a "0," switch 16 will be opened during each charging period. At this time, synthesis of the second quantum level digit begins, and switch 17 is closed. Thus, during the charging cycle, capacitors 11 and 13 are connected in parallel with the reference voltage source 9 and, if the previous digit was a "1," capacitor 12 is also charged. Thus, the parallel capacitance is either 5C or 13C. During the next redistribution period, the voltage which settles across the total parallel combination is therefore either 5v./16 or 13v./16. This is the $e_K$ for the next comparison. The second quantum level digit is then emitted by the comparator in response to the relative value of $e_K$ with respect to the analog sample. This digit causes the switch control to set switch 17 in the same manner as the previous digit had caused the switch control to set switch 16. If it is a "1," switch 17 will be closed during each subsequent charging period; otherwise, it will be opened. This process of charging, redistribution, comparison and pulse emission is repeated once for each quantum level digit. After $n$ such cycles, the switches are returned to the reset position to begin the synthesis of the next PCM word.

For the example discussed, a five digit PCM word would result, one for a polarity indication and one for each of the four quantum levels. It is apparent that, for a PCM word of $n$+1 digits, the loop sequence process would need to be repeated for $n$ weighted capacitors.

Figure 3:
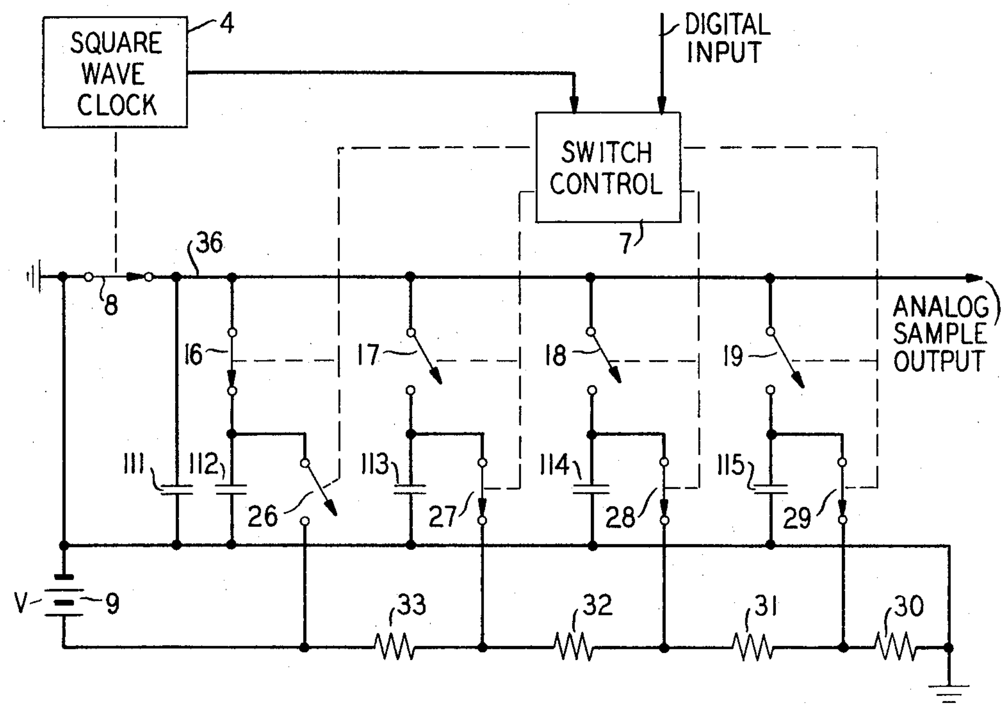
FIG. 3 is a second illustrative embodiment of the same portion of the encoder of FIG. 1.

FIG. 3 shows a second illustrative embodiment of the portion of the encoder of FIG. 1 which was represented by the embodiment of FIG. 2. In the FIG. 2 embodiment, a a plurality of capacitors was weighted in accordance with the binary code. Since the charge on each capacitor is equal to the product of the capacitance and the voltage on the capacitor ($Q=CV$), it is apparent that the same results would accrue if all of the capacitors were equal in magnitude and the voltages to which each are charged were weighted ($Q=[KC]V=C[KV]$). Such is the case of the embodiment shown in FIG. 3. The switch control 7, the square wave clock 4, the reference voltage source 9 and the plurality of complementary switches 16 through 19 and 26 through 29 are unchanged from the embodiment of FIG. 2. In this embodiment, however, the plurality of capacitors, designated as 111 through 115, are equal, valued at some capacitance C. The reference voltage source 9 is still valued at V, but is now divided over a plurality of resistors 30 through 33. In this embodiment, the resistors are weighted according to the binary code; resistor 30 is valued at some unit resistance R and resistors 31 through 33 are valued at 4R, 2R, and R. Thus, the voltages at the points between the resistors are thereby weighted in accordance with the binary code. Furthermore, in this embodiment, switch 8 has been connected to ground instead of to the reference voltage source 9.

The operation of this embodiment is identical to the embodiment of FIG. 2 with the following exception. In the first half period, if switches 16, 17, 18, or 19 are closed, the corresponding capacitor is discharged instead of being charged. The remaining capacitors are therefore charged to the voltage established by the division of the reference voltage from voltage source 9 over resistors 30 through 33. Capacitor 111 is therefore discharged during alternating half periods instead of being charged as in the embodiment of FIG. 2. In the other half period, all capacitors are connected in parallel to the analog sample bus 36 by means of the closure of switches 16, 17, 18, and 19 and the opening of switch 8. Thus, during the charging period, each capacitor may be either charged to a weighted reference voltage or discharged and, during the redistribution period, all capacitors are connected in parallel to the output bus 36 and charge redistribution takes place.

Figure 4:
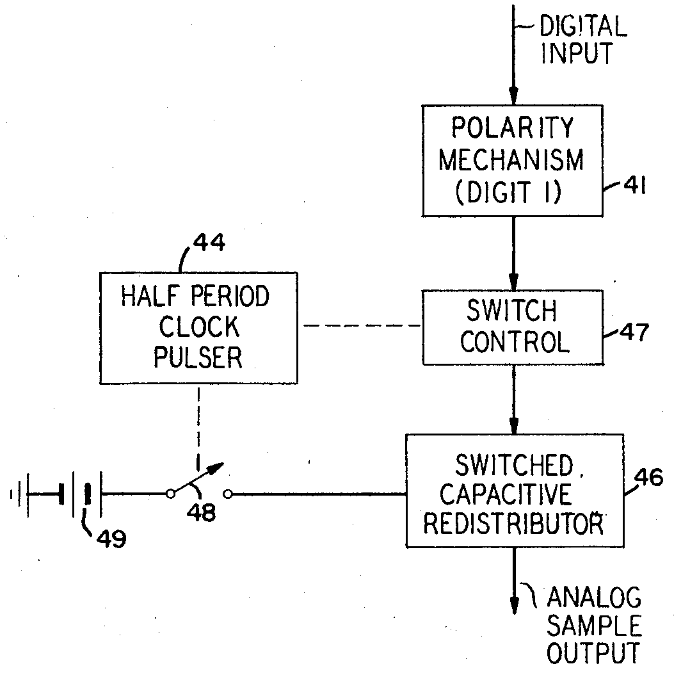
FIG. 4 is an illustrative embodiment of a digital to analog converter which embodies the principles of the invention.

The embodiments which were previously discussed utilized the invention only insofar as it applied to analog to digital conversion. As was previously mentioned, however, the principles of the invention are equally applicable to digital to analog conversion. FIG. 4 shows a block diagram of a parallel, or flash, digital to analog decoder which utilizes the principles of the invention. In this embodiment, the input digits are received by a polarity mechanism 41. This mechanism considers only the first digit of the PCM word, and makes the appropriate polarity adjustments which are indicated thereby. For instance, if a polarity switching scheme were being used, the polarity mechanism 41, in response to the first digit, would cause the reference voltage source 49 to be switched to the proper polarity. Once polarity considerations have been implemented, the remaining quantum level digits are passed to the switch control mechanism 47. Since this decoder is to operate in a parallel mode, the switch control 47 is embodied as a plurality of independent controlling mechanisms such as flip flops, each being associated with a different capacitor in the switched capacitive redistributor 46. The switched capacitive redistributor 46 may be embodied by either of the configurations of capacitors shown in FIGS. 2 and 3. Once more, a half period clock pulser 44 controls the timing. Under its control, the switch control network 47 and a single pole single throw switch 48 are operated. It is the function of switch 48 to connect reference voltage source 49 to the switched capacitive redistributor during the charging half of the cycle. The analog sample output of the decoder is taken from the switched capacitive redistributor 46.

The operation of the decoder of FIG. 4 is quite simple and may be briefly described in conjunction with the embodiment shown in FIG. 2. (The embodiment of FIG. 3 applies equally well.) For this description, we assume that the switch control network 47 comprises a plurality of independent switch control apparatus, each apparatus operating a different complementary switch pair in response to a particular digit of the PCM word to be encoded. Each PCM word requires one clock period for decoding. Again, it is convenient to divide the half period timing into charging and redistribution steps. During the first half period, switch 48 is closed, thereby connecting the reference voltage source 49 to the analog output bus of the switched capacitive redistributor 46. In addition, during the charging period, each flip flop of the switch control network 7 operates its particular complementary pair of switches in the switched capacitive redistributor. If the digit to which a flip flop corresponds is a "1," the top switch which it operates is closed and the bottom switch is opened thereby connecting that particular capacitor to the analog output bus. If the digit to which a flip flop corresponds is a "0," the opposite occurs and that particular capacitor is grounded. Thus, during the charging period, the reference voltage source is connected to a parallel combination of capacitor 11 and each of capacitors 12 through 15 which corresponded to PCM ones. In the second half period, switches 48 and 49 are opened and switches 16 through 19 are closed. This results in a parallel combination of all capacitors. Since the capacitors corresponding to digital ones had been charged to the reference voltage, a charge equal to the product of the reference voltage and the capacitances of the particular capacitor had been stored on each of them. Thus, when they are connected in parallel during the redistribution step, this charge redistributes among all capacitors. The voltage which settles across the parallel combination, $e_K$, is equal to the ratio of the total charge previously stored to the total capacitance of the parallel combination. Then, $e_K$ may be taken as the analog sample output voltage. In the next half period, the subsequent charging step, a new PCM word is considered and the switches are once more operated in response thereto.

The operation of the digital to analog converter, as discussed, was chosen for a five-digit PCM word (a polarity digit and four quantum level digits). To expand the scope of the operation to include more quantum levels, one need only add a capacitor, a pair of complementary switches, and an appropriate switch control mechanism for each digit to be so added. The number of available quantum levels is doubled for each digit which is so added.

Figure 5A:
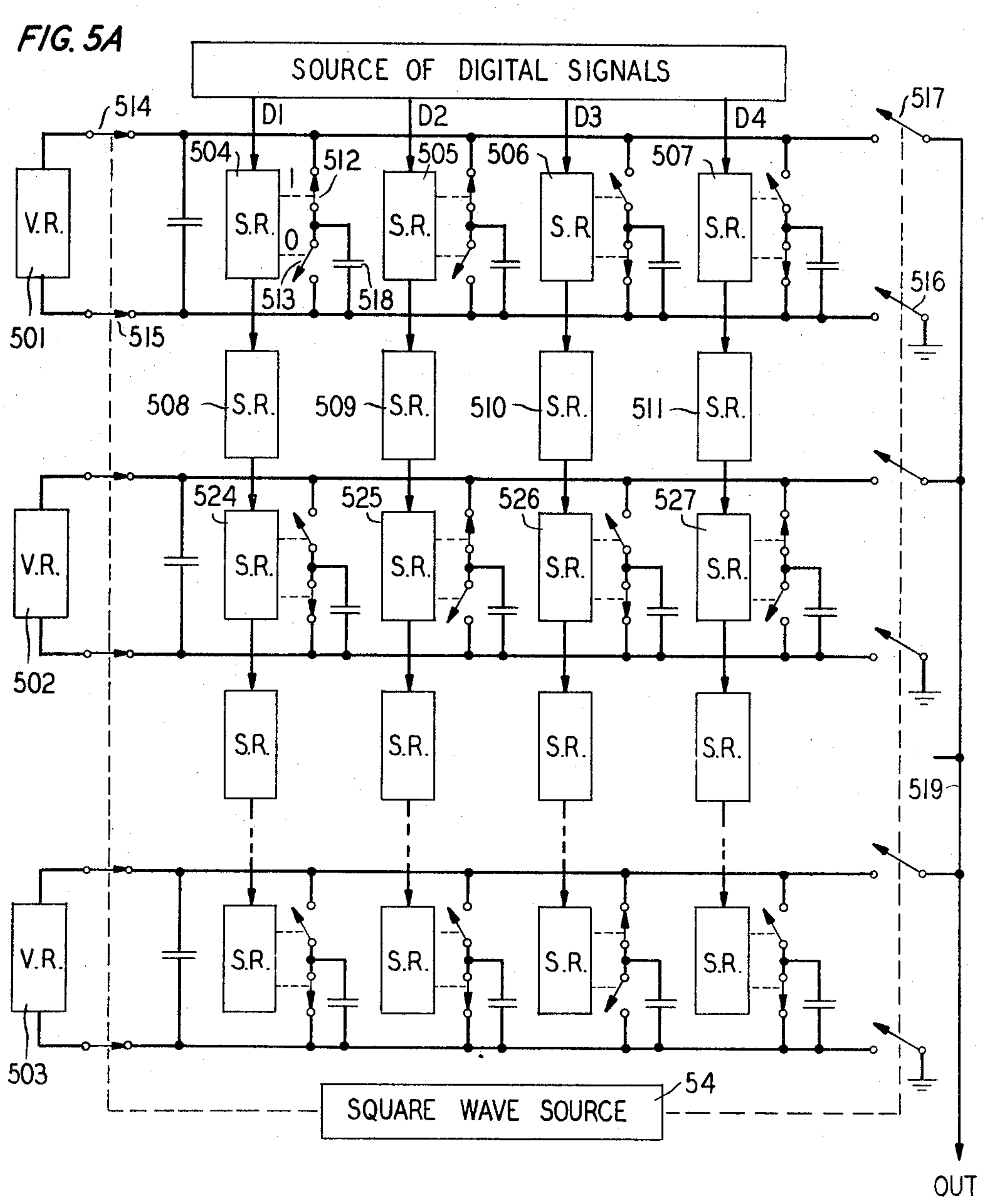
FIGS. 5A, 5B, and 5C show a multilevel pre-equalizer which embodies the principles of the invention and two voltage waveforms relating thereto.
Figure 5B:
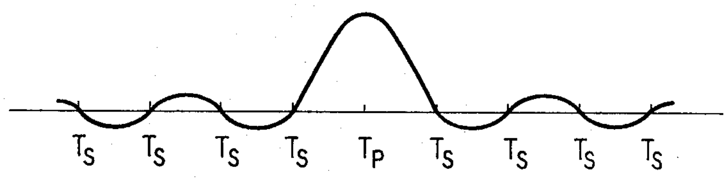
Figure 5C:
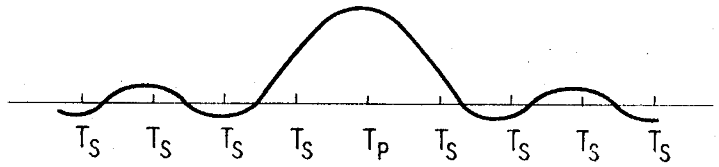

At this point, it is appropriate to consider the principles of the invention insofar as they pertain to multilevel digital pre-equalizers. FIG. 5A shows a block diagram of a digital pre-equalizer which utilizes the principles of the invention. FIGS. 5B and 5C show pulse waveforms which are transmitted over such a transmission system.

We first consider the waveform of FIG. 5B, which is a diagram of the waveform of the well known sin $x/x$ function, a standard waveform for pulse transmission. This waveform features some specific value at the sampling time of interest, $T_p$, and is zero at all other sampling points, $I_s$. Thus, transmission of a succession of these waveforms results in the specific values whenever a pulse occurs and zero at all other sampling times.

If no distortion were to be introduced by the transmission medium, equalization would not be necessary. FIG. 5C shows one version of the waveform of FIG. 5B after it has been transmitted through the transmission medium. While the waveform of FIG. 5C retains its value at $T_p$, the distortion also causes voltages of some finite value at the other sampling points. Thus, to correct the waveform of FIG. 5C back to that of FIG. 5B, it is necessary to add or subtract increments of voltage at the $T_s$ sampling points to return each of them to zero. Such a procedure would eliminate intersymbol distortion.

It is apparent that, if a known signal waveform is to be transmitted, a knowledge of the distorting conditions of the transmission medium allows for a predistortion of the waveform such that, when the signal arrives at the receiver, the transmission medium will have distorted it back to the desired wave shape. This process of characterizing the medium and predistorting transmitted signals to compensate for distortion introduced by the medium is known as pre-equalization.

Turning to the illustrative embodiment shown in FIG. 5A, the repetition of several circuits similar to the circuit of FIG. 2 is apparent. For pre-equalizer applications, each circuit so used corresponds to a different sampling time, and the number of circuits used depends on the accuracy of equalization which is desired. The polarity and voltage of each variable reference source 501, 502, and 503 is adjusted in response to information concerning the distortion characteristics of the transmission medium.

The operation of the pre-equalizer of FIG. 5A proceeds as follows. Initially, the information to be transmitted is digitally encoded and the digital code word is placed onto the first set of shift registers 504 through 507. Half period pulse timing controls the circuitry, and each new period a new code word is placed on controlling shift registers 504 through 507 and the new code word which was previously contained on controlling shift register 504 through 507 is passed onto the next set of controlling shift registers, 525 through 527, by means of intermediary shift registers 508 through 511. In this manner, digital code words are passed from shift register to shift register during each half period. The intermediary shift registers 508 through 511 are provided to account for the half period timing.

At each capacitive circuit, a redistribution operation takes place. We assume for this discussion that the variable reference voltage is properly adjusted to correspond to the distortion to be introduced at a given sampling point. Each

BEST AVAILABLE COPY digit of the code word is placed during the first half period on a controlling shift register, e.g., shift registers 504 through 507. Each of these shift registers, in turn, operates a complementary pair of switches, each complementary pair being associated with a capacitor which is weighted to correspond to the binary digit. For example, shift register 504 operates switches 512 and 513, which switches are associated with capacitor 518, which is weighted to correspond to the first binary digit. If the digit contained in shift register 504 during the first half period is "1" switch 512 is closed and switch 513 is opened; otherwise, switch 513 is closed and switch 512 is opened. If a closure of switch 512 occurs, it is during the half period when switches 514 and 515 are closed and switches 516 and 517 are opened. Thus, whenever switch 512 is closed, capacitor 518 is charged to the voltage of variable reference source 501. Otherwise, capacitor 518 is discharged. During this first half period similar operations occur at each controlling shift register, thereby charging or discharging each of the capacitors with which they are associated to the respective reference voltages.

During each second half period, switches 514 and 515 (and all corresponding switches which are associated with other reference sources) are opened and switches 516 and 517 (and all their corresponding switches) are closed. In addition, all complementary switch pairs (e.g., 512 and 513) are operated such that the top switch (e.g., switch 512) is closed and therefore the bottom switch (e.g., switch 513) is opened. Thus, during each second half period, all capacitors in the entire pre-equalizer are connected in parallel to the output bus 519, some having been charged to their respective variable reference voltage and others having been discharged. A grand charge redistribution takes place during this half period, and the resulting voltage which settles over the entire combination is the voltage which is to be transmitted. During this second half period, the digital code words are shifted to the intermediary shift registers so that during the next half period, all the switches may be reset to prepare for the following digital code word. In other words, during each second half period, the digital code words are shifted to the succeeding intermediary shift register. This resetting of all switches corresponds to the introduction of a digital word of all "1's." Thus, at any given time, alternating sets of shift registers contain digital words corresponding to digital code words while the other alternating sets of shift registers correspond to "reset" digital words of all "1's."

From this discussion it may be seen that the output voltage which settles on output bus 519 corresponds to a combinational effect of each of the analog samples which are represented by binary code words in the pre-equalizer at that time. The magnitude and polarity of their contribution depends on the adjustment of the variable reference voltage sources (e.g., 501, 502) in response to the distortion conditions of the medium. Thus, if each capacitive redistribution circuit corresponds to a sampling point ($T_s$ or $T_p$) the correction factor for predistortion of a given sample is obtained by adjusting the associated variable reference voltage source, pre-equalization may be successfully accomplished.

It is to be understood that the above described arrangements are illustrative of the application of the principles of the invention. Numerous other arrangements may be devised by those skilled in the art without departing from the spirit and scope of the invention.

What is claimed is:

1. In a system which utilizes analog type signals coded as digital type signals comprising binary words, each word being associated with an analog sample and each digit of a word being associated with a quantizing level of the coded sample, apparatus for converting signals of one type to corresponding signals of the other type comprising:

a reference voltage source;

a source of timing pulses;

a plurality of capacitors, each capacitor corresponding to a different digit in the binary words and each being connected on one side to ground;

charging means, under the control of the timing pulses, for selectively charging each of said capacitors upon the occurrence of its corresponding digit pulse, the charge placed on each of said capacitors being weighted in accordance with the binary digit with which each capacitor is associated; and, means, under the control of the timing pulses, for connecting said capacitors in parallel to an output bus at a time subsequent to the charging of said capacitors.

2. Apparatus as described in claim 1 and further including means, under the control of the timing pulses, for comparing the analog sample voltage with the voltage on said output bus and for producing digital signals representative of these comparisons.

3. Apparatus as described in claim 2 and further including means, responsive to the signal to be converted, for selecting the polarity of said reference voltage source, said reference voltage source being capable of producing a reference voltage of either polarity.

4. A signal converting means as claimed in claim 1 wherein said charging means comprises a plurality of resistors separated by taps, switching means for connecting said taps and said capacitors, and means, under the control of timing pulses and responsive to digital signal pulses, for operating said switching means.

5. In a transmission system which utilizes analog type signals transmitted in the form of multilevel digital type signals, means for equalizing the multilevel digital type signals to compensate for distortion introduced by a transmission medium comprising means for encoding the analog type signals as binary words, each word being associated with a sample of the analog signal and each digit of a word being associated with a quantizing level of the coded sample, a source of timing pulses, a plurality of capacitive circuits, each comprising a variable reference voltage source, a plurality of switched capacitors, each being weighted to correspond to a digit in the binary words and each being connected on one side by first switching means between a redistribution bus and a grounding bus and on the other side to said grounding bus, a fixed capacitor connected between said redistribution bus and said grounding bus, a plurality of control shift registers, each being associated with one of said capacitors and responsive to the associated digit of a binary word, the position of said first switching means being controlled by the state of said controlling shift registers, and second switching means, under the control of the timing pulses, for connecting said variable reference voltage source to said grounding bus and to said redistribution bus and for connecting said grounding bus to ground, a plurality of intermediary shift registers, each being connected between corresponding controlling shift registers of said capacitive circuits, and means, under the control of the timing pulses, for connecting all of said capacitors in parallel to an output bus.

6. An encoder for converting analog type signals and digital type signals, one to the other, comprising: a reference voltage source;

a plurality of capacitors, each capacitor being associated with a different digit of a digital word;

and means, responsive to a first timing signal and to the digits of a digital word, for selectively connecting said voltage source to those capacitors of said plurality of capacitors which will establish a charge on the selected capacitors equivalent to a quantization level corresponding to said digital word, and for subsequently connecting, in response to a second timing signal, all of said plurality of capacitors in parallel, whereby the charge on the selected capacitors redistributes among said plurality of capacitors to establish a voltage equivalent to said quantization level.

7. An encoder as described in claim 6 and further including a first capacitor, said first capacitor being connected to said reference voltage source during said first timing signal and being connected to said plurality of capacitors during said second timing signal.

* * * * *